United States Patent [19]

Serwatzky

[11] Patent Number: 5,231,867
[45] Date of Patent: Aug. 3, 1993

[54] DEVICE FOR DETECTING LEAKS IN A FLANGED JOINT

[75] Inventor: Günter Serwatzky, Grafschaft, Fed. Rep. of Germany

[73] Assignee: Dipl. -Ing. Wrede & Niedecken Verwaltung GmbH, Fed. Rep. of Germany

[21] Appl. No.: 725,356

[22] Filed: Jul. 3, 1991

[30] Foreign Application Priority Data

Jul. 5, 1990 [DE] Fed. Rep. of Germany ....... 4021369

[51] Int. Cl.$^5$ .............................................. G01M 3/28
[52] U.S. Cl. ...................................................... 73/46
[58] Field of Search ................ 73/40, 46, 49.8; 277/2

[56] References Cited

U.S. PATENT DOCUMENTS

| 2,350,867 | 6/1944 | Bean et al. | 73/46 X |
| 2,460,238 | 1/1949 | Penick | 73/46 X |
| 4,019,371 | 4/1977 | Chaplin et al. | 73/46 |
| 4,410,186 | 10/1983 | Pierce, Jr. | 73/46 X |

FOREIGN PATENT DOCUMENTS

| 2323295 | 4/1977 | France | 73/46 |
| 22985 | 2/1977 | Japan | 73/46 |
| 139737 | 6/1986 | Japan | 73/46 |

*Primary Examiner*—Hezron E. Williams
*Assistant Examiner*—Joseph W. Roskos
*Attorney, Agent, or Firm*—John F. A. Earley; John F. A. Earley, III

[57] ABSTRACT

The invention relates to a device for detecting leaks in a flanged joint, with therebeing formed between the flanges a hollow space in which pressure changes, changes in the physical condition and/or conductivity changes are detected in the event of a leak by a corresponding sensor.

13 Claims, 1 Drawing Sheet

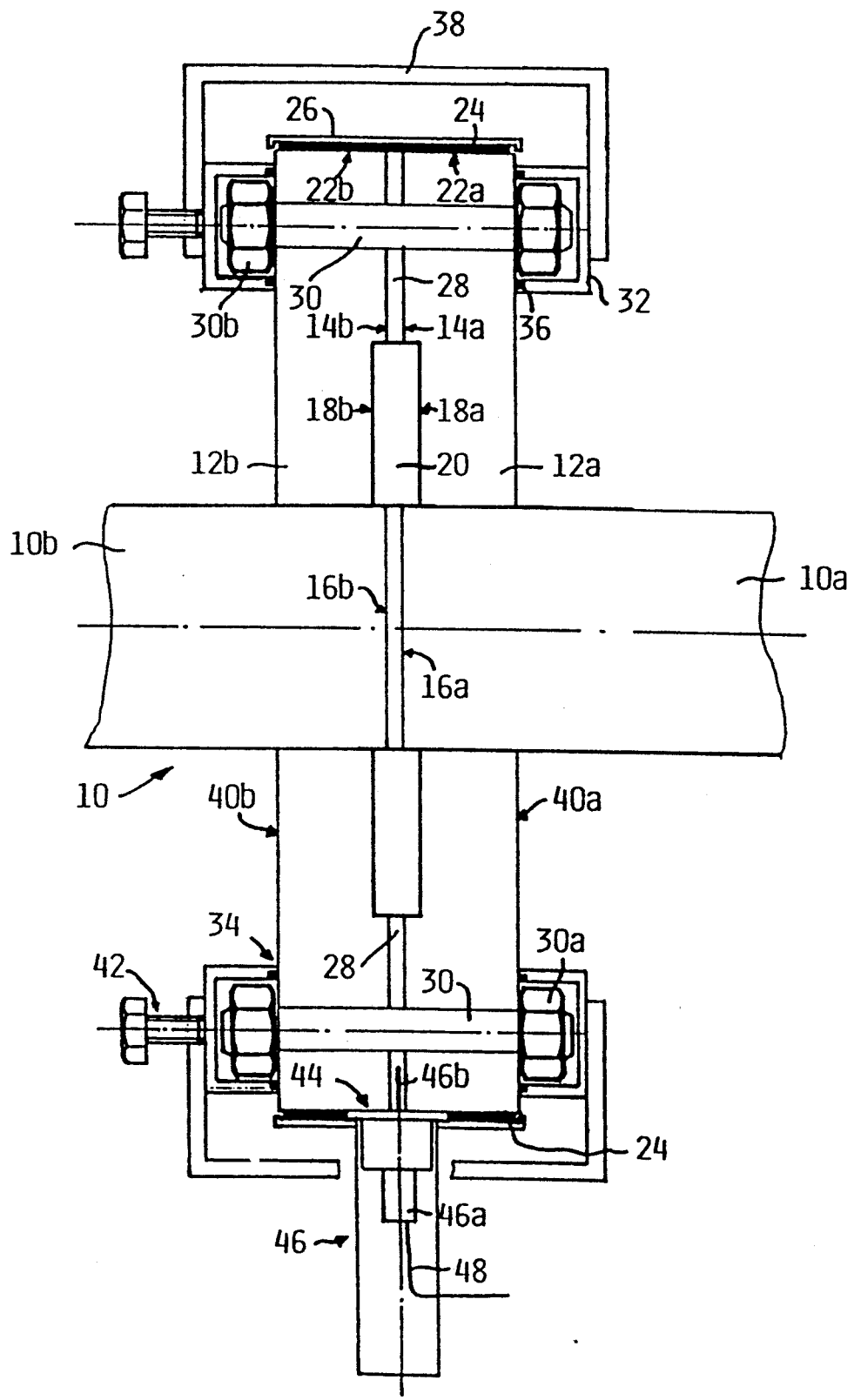

DEVICE FOR DETECTING LEAKS IN A FLANGED JOINT

DESCRIPTION

The invention relates to a device for detecting leaks in a flanged joint.

It is only very rarely possible to construct containers and pipelines as "closed" units. More commonly, for example in the case of pipelines, individual pipe sections are coupled together by means of suitable flanged joints.

These very points are particularly susceptible to leaks, i.e. places at which liquids or gases stored in the container or transported through a pipeline can escape. In pipelines there is the added factor that the transported medium is frequently under pressure so that a leak which is not detected in time may lead to rupture of the entire system.

To prevent this and avoid possible environmental damage, there is an urgent need in the industrial sector for suitable devices for detecting leaks.

In this regard, DE-PS 38 18 416 discloses a first proposal which is substantially based on catching the liquid escaping at a leakage point in a container, which is elastically suspended and whose lowering, in the event of liquid entering it, is recorded and indicated.

The known leak monitoring device has proved successful in principle. However, it can only be used for applications where liquids are being transported. Gas leaks cannot be recorded.

The basic aim of the invention is to offer a device for detecting leaks in a flanged joint, by means of which automatic monitoring of any gas or liquid escape may be guaranteed. Here, the term "flanged joint" is understood to represent all types of connection element between adjacent components. The device is preferably to be capable of retrofitting on existing flanged joints.

In its most general form, the invention proceeds from a device for detecting leaks in a flanged joint which is constructed with an inner seal between the flanges and a further seal which externally blanks off the spaced-apart flanges, with the hollow space thus formed between the inner and outer seal being equipped with a sensor which records and indicates a change in the pressure, the medium (gas/liquid) and/or its electric conductivity.

Usually, a seal is disposed between the flanges of a flanged joint. As a result, the inner surfaces of the flanges in the locking position are a specific distance apart.

According to the invention, said distance is used to form a closed hollow space, in which the (conventional) flange seal is arranged displaced inwards to a greater or lesser extent and a second outer seal is provided.

If a leak then occurs in the region of the inner flange seal, the transported medium (liquid or gas) penetrates through the seal or past the seal into the hollow space.

Usually the transported medium, which is being conveyed, for example, through a pipeline, is under pressure. Consequently, in the event of a leak, there will likewise be in the region of the hollow space an increase in pressure which, according to the invention, will be immediately recorded by a pressure sensor disposed in the hollow space.

Thus, the sensor detecting the pressure increase records a leak in the region of the flanged joint almost instantaneously and indicates it by means of connected optical or acoustic signaling devices.

Said pressure-measuring device may be arranged virtually in any desired manner. Thus, the sensor may be disposed completely inside the hollow space, provided there is enough room there. According to an advantageous embodiment, it si provided that only the metrologically effective probe of the sensor projects into the hollow space, with the remaining part of the sensor being disposed outside. Naturally, this means that it has to be conveyed through the outer seal, with said region preferably being of a gas- and liquid-tight construction.

In principle, the device according to the invention with a pressure-measuring device may also be used to detect a liquid leak since this also produces a pressure increase inside the hollow space, especially if the liquid itself is under pressure or is being conveyed under pressure.

Particularly in cases where the flanged joint i disposed on containers or pipelines which are filled with a liquid or through which a liquid is transported which has an electric conductivity, an alternative form of the invention provides for the arrangement, in place of a pressure sensor, of a sensor which records and indicates variations in the electric conductivity inside the hollow space.

Whereas, normally, the hollow space is filled with air whose electric conductivity is virtually zero, the conductivity sensor records an electric conductivity as soon as the liquid penetrates through the leakage point into the hollow space and comes into contact with the sensor.

In order to ensure that recording and indication of such a leak is as instantaneous as possible, it is advantageous to dispose the conductivity sensor in the bottom section of the hollow space since—irrespective of the location of the leak—gravitation will always cause the liquid to flow downward inside the hollow space.

Otherwise the sensor may be disposed in the manner described above for the pressure sensor.

Finally, however, the invention also offers a third design variation for the construction of the sensor. This is an optical detector, which may be used to determine a change in the physical condition of the medium inside the hollow space. Such optical sensors are constructed, for example, as follows:

The probe is in the shape of a cylinder. A collimated beam of light is passed from a light source axially through the probe up to a bevelled face, where the light beam is reflected to an adjacent inclined surface and from there is conveyed more or less parallel to the first path back to an opto-receiver. The optical path length and the refractive indices of the bevelled faces of the probe are designed in such a way that under normal conditions (when the hollow space is filled only with air) the emitted light beam (e.g. infrared or laser radiation) is recorded after its path through the probe in the receiver unit.

If a leak then occurs and hence liquid penetrates into the hollow space, the liquid wets the face of the probe (its bevelled surfaces), thereby simultaneously altering the angle of refraction of the light beam, so that the light beam is reflected at a different angle and is no longer recorded or at least its full intensity is no longer recorded by the receiver unit. Said deviation from the normal value serves as an indication of a leak, which may then be immediately indicated by means of connected devices.

The structural design of the device may in other respects be adjusted according to the spirit of the invention to suit the prevailing local conditions.

It is particularly preferred if the outer seal takes the form of an annular seal, which extends on the peripheral surfaces of the flanges and in so doing overlaps the space between the flanges. In order on the one hand—for retrofitting existing systems—to be able to apply the outer annular seal but on the other hand also to allow easy release of the flanged joint in the event of a leak, a further embodiment of the invention provides for fixing of the annular seal by means of an external clamping device. In the case of circular flanges, said device may be a clamping ring.

Normally the (inner) seal between the flanges is held in position by the flanges being fastened towards one another by means of screws or the like.

In order to ensure, in the event of a leak, that the pressure building up in the hollow space cannot escape through the openings in the flanges for the screws, said region should be additionally sealed. This may be effected on the one hand, especially in new systems, by means of seals along the threaded portions of the screws but on the other hand, especially for retrofits, also by externally sealing the screw heads and/or nuts. To said end, an advantageous embodiment provides for the mounting of sealing caps on the outside of the screw heads and/or nuts, said caps being preferably braced in pairs towards one another with the aid of retaining clips.

Particularly in systems where liquids are being stored or transported, it may in addition be expedient to arrange a vent emanating from the hollow space. Said vent may be disposed either in the region of the outer seal which overlaps the gap between the flanges, or alternatively it may be provided in the flanges themselves or in the region of the sensor. It is thereby ensured that the liquid may freely penetrate into the hollow space and reach the sensor.

The vent should preferably be disposed at the top to prevent any liquid from escaping.

Further forms of the invention are disclosed in the features of the sub-claims and in the further application documents.

The invention is described in greater detail hereinafter with reference to an embodiment.

The single drawing shows a diagrammatic side view of a flanged joint in a pipeline which, for greater clarity, is partially cut open.

The pipeline 10 comprises a first pipe section 10a with an annular flange 12a on its free end and a second pipe section 10b with an annular flange 12b on its free end.

The flanges 12a, 12b are arranged so that their faces 14a, 14b are flush with the faces 16a, 16b of the pipe sections 10a, 10b. In the region adjoining the pipe sections 10a, 10b, however, the faces 14a, 14b each have a recess 18a, 18b used to receive an annular seal 20.

The seal 20 is basically a conventional seal between adjacent flanges of a flanged joint. Hereinafter it is referred to as inner seal 20.

As the drawing reveals, the width of the inner seal 20 is such that the faces 14a, 14b of the flanges 12a, 12b otherwise extend at a distance from one another.

The annular peripheral surfaces 22a, 22b of the flanges 12a, 12b are overlapped by a common annular seal 24 which is itself in turn held in position on the flanges 12a, 12b by a clamping ring 26.

Thus, a hollow space 28 is formed between the inner seal 20 and the outer seal 24.

The flanges 12a, 12b are moreover braced towards one another by a plurality of screws 30. Placed over the screw heads 30a and/or nuts 30b are sealing caps 32, which have seals 36 in their free edge region at 34 and are moreover pressed in pairs by a retaining clip 38 onto the outer faces 40a, 40b of the flanges 12a, 12b. This is effected by means of a tightening screw 42.

As is evident from the drawing, the annular seal 24 has at the bottom an opening 44 in which a pressure-measuring device (sensor) 46 is disposed in a gas- and liquid-tight manner relative tot he hollow space 28. The body 46a of the sensor 46 extends outside of the annular seal 24, while the actual probe 46b projects through the opening 44 into the hollow space 28. The sensor 46 is moreover externally connected by suitable connections 48 to a recording and indicating device (not shown), the function and operation of which are described below.

The construction of the flanged joint shown in the drawing and described above consequently results in a hollow space 28 which is hermetically sealed on all sides and which normally contains air.

If a leak then occurs in the region of the inner seal 20, liquid or air (gas), depending on what is being transported in the pipeline 10, penetrates past the inner seal 20 in to the hollow space 28. Since the transported medium is under pressure, this leads perforce in the hollow space 28 to a pressure increase which is immediately detected by the probe 46b of the sensor 46 and picked up by the connected recording and indicating device. The fault may then be immediately indicated, for example, by means of an optical or acoustic signal.

The device according to the invention therefore meets the demands placed upon it with simple structural means but nevertheless allows reliable and virtually instantaneous detection of a leak.

Instead of the pressure-measuring device (sensor 46), which may be a simple manometer, the sensor 46 may—as described above—take the form of an optical or electric sensor.

I claim:

1. Device for detecting leaks in a flanged joint, having an inner seal (20) between the flanges (12a, 12b) and an outer seal (24) which externally blanks off the spaced-apart flanges (12a, 12b), with there being formed between inner and outer seal (20, 24) a hollow space (28) containing a sensor (46), which records and indicates a change in the pressure, the medium (gas/liquid) and/or the electric conductivity in the hollow space (28).

2. Device according to claim 1, further comprising screws (30) which connect the flanges (12a, 12b) to one another, the screws (30) being sealed off from the hollow space (28).

3. Device of claim 1, the sensor (46) projecting through the outer seal (24) in a gas-tight and liquid-tight manner and being electrically connected at its outer end, the sensor (46) including a metrologically effective probe (46a) which projects into the hollow space (28).

4. Device of claim 1, the outer seal (24) being annular and extending on peripheral surfaces (22a, 22b) of the flanges (12a, 12b), the outer seal (24) overlapping the hollow space (28).

5. Device according to claim 4, the annular seal (24) being held by an outer clamping device (26).

6. Device for detecting leaks in a flanged joint having a first flange and a second flange, the first flange having an inner portion and an outer portion, the second flange having an inner portion and an outer portion, the first flange being spaced apart from the second flange, the first and second flanges being pulled together by screws extending through them, the screws having threads, comprising an inner seal mounted between the inner portions of the first flange and the second flange, an outer seal mounted on the outer end portions of the first flange and the second flange externally sealing the spaced-apart first and second flanges, a hollow space formed between the inner seal, the outer seal, and the spaced-apart first and second flanges, and a sensor mounted in the hollow space for recording a leak entering the hollow space, the sensor having a portion which extends outside the hollow space, a probe which projects into the hollow space, and a portion connected to the outer seal in a gas-tight and liquid-tight manner, the outer seal having an annular shape, the outer seal being held in place by an outer clamping device, seals mounted along the threads of the screws pulling the first and second flanges together, sealing caps mounted on the first and the second flanges to cover the screws projecting from the first and the second flanges, retaining clips mounted on the sealing caps for retaining the sealing caps in place, and a vent formed in a top portion of the outer seal for venting the hollow space.

7. Device for detecting leaks in a flanged joint having screws (30) for connecting the flanges (12a,12b) of the flanged joint to one another, comprising an inner seal (20) between the flanges (12a, 12b), an outer seal (24) which externally blanks off the spaced-apart flanges (12a, 12b), with there being formed between inner and outer seal (20, 24) a hollow space (28) containing a sensor (46), which records and indicates a change in the pressure, the medium (gas/liquid) and/or the electric conductivity in the hollow space (28), and seals for sealing off the screws (30) from the hollow space (28), the seals extending along the threads of the screws (30).

8. Device for detecting leaks in a flanged joint having screws (30) and nuts (30b) for connecting the flanges (12a,12b) of the flanged joint to one another, the screws (30) having screw heads (30a), comprising an inner seal (20) between the flanges 12a, 12b), an outer seal (24) which externally blanks off the spaced-apart flanges (12a,12b), with there being formed between inner and outer seal (20, 24) a hollow space (28) containing a sensor (46), which records and indicates a change in the pressure, the medium (gas/liquid) and/or the electric conductivity in the hollow space (28), and means for externally sealing the screw heads (30a) and nuts (30b) that project beyond the flanges (12a, 12b).

9. Device according to claim 8, in which the screw heads (30a) and nuts (30b) are covered by sealing caps (32) which may be braced in pairs towards one another with the aid of retaining clips (38).

10. Device for detecting leaks in a flanged joint, comprising an inner seal (20) between the flanges (12a, 12b), an outer seal (24) which externally blanks off the spaced-apart flanges (12a, 12b), with there being formed between inner and outer seal (20, 24) a hollow space (28) containing a sensor (46), which records and indicates a change in the pressure, the medium (gas/liquid) and/or the electric conductivity in the hollow space (28), and a vent emanating from the hollow space (28).

11. Device according to claim 10, in which the vent is disposed at the top section of the hollow space.

12. Device of detecting leaks in a flanged joint having a first flange and a second flange, the first flange having an inner portion and an outer portion, the second flange having an inner portion and an outer portion, the first flange being spaced apart from the second flange, comprising an inner seal mounted between the inner portions of the first flange and the second flange, an outer seal mounted on the outer portions of the first flange and the second flange externally sealing the spaced-apart first and second flanges, a hollow space formed between the inner seal, the outer seal, and the spaced-apart first and second flanges, and a sensor mounted in the hollow space for recording a leak entering the hollow space.

13. A method of detecting leaks in a flanged joint having a first flange and a second flange, the first flange having an inner portion and an outer portion, the second flange having an inner portion and an outer portion, the first flange being spaced apart from the second flange, comprising the steps of providing an inner seal between the inner portions of the first flange and the second flange, providing an outer seal on the outer portions of the first flange and the second flange so as to externally seal the spaced-apart first and second flanges, forming a hollow space between the inner seal, the outer seal, and the spaced-apart first and second flanges, mounting a sensor in the hollow space in a gas-tight and liquid-tight manner, and indicating a change in pressure, medium and/or electrical conductivity of the hollow space, as sensed by the sensor.

* * * * *